United States Patent
Lothen

[15] 3,656,639
[45] Apr. 18, 1972

[54] BOAT TRAILER WITH LAUNCHING AND LOADING DEVICE

[72] Inventor: Julius Lothen, 1600 Elliot Avenue South, Minneapolis, Minn. 55404

[22] Filed: May 14, 1970

[21] Appl. No.: 37,153

[52] U.S. Cl. ........................................ 214/84, 280/414
[51] Int. Cl. ..................................................... B60p 3/10
[58] Field of Search ................ 214/505, 506, 84, 83.24; 280/414

[56] References Cited

UNITED STATES PATENTS

| | | | |
|---|---|---|---|
| 2,558,418 | 6/1951 | Brueckman | 214/84 |
| 2,932,418 | 4/1960 | Ripley | 214/505 |
| 2,830,717 | 4/1958 | Posey | 214/84 |
| 3,438,524 | 4/1969 | Snodgrass | 214/505 |
| 3,009,589 | 11/1961 | Martz | 214/84 |
| 2,858,951 | 11/1958 | Cabluck | 214/505 |

Primary Examiner—Albert J. Makay
Attorney—Williamson, Palmatier & Bains

[57] ABSTRACT

A conventional boat trailer comprising a chassis, ground engaging wheels, winch, and stationary revolvable tapered support rollers is provided with a boat launching and loading device. The boat launching and loading device includes a pair of narrow parallel elongate tracks affixed to the chassis of the trailer and extending from the front end portion thereof substantially beyond the rear end portion of the chassis. The tracks are centrally located on the chassis and accommodate a small bow-supporting carriage which cooperates with the width and conventional stationary rollers to facilitate launching and loading the boat.

5 Claims, 3 Drawing Figures

PATENTED APR 18 1972 3,656,639

INVENTOR.
JULIUS LOTHEN

BY Williamson, Palmatier
& Bains
ATTORNEYS

BOAT TRAILER WITH LAUNCHING AND LOADING DEVICE

SUMMARY OF THE INVENTION

An object of this invention is to provide a conventional boat trailer with a novel boat launching and a loading device. This launching and loading device is of simple and inexpensive construction and may be incorporated in a conventional commercial boat trailer without requiring extensive structural alterations to the trailer.

The boat launching and loading device includes a pair of tracks extending longitudinally of the trailer chassis and projecting beyond the rear of the chassis. A small bow supporting carriage is rollably supported on the tracks and cooperates with the winch and conventional stationary rollers on the trailer chassis to facilitate launching and loading the boat. While only a small portion of the bow of the boat is supported on the carriage, this manner os support of the boat has been found to be very effective in facilitating launching and loading of the boat. These and other objects and advantages of this invention will more fully appear from the following description made in connection with the accompanying drawings wherein like reference characters refer to the same or similar parts throughout the several views.

DETAILED DESCRIPTION OF THE INVENTION

Figures 1, 2, 3:
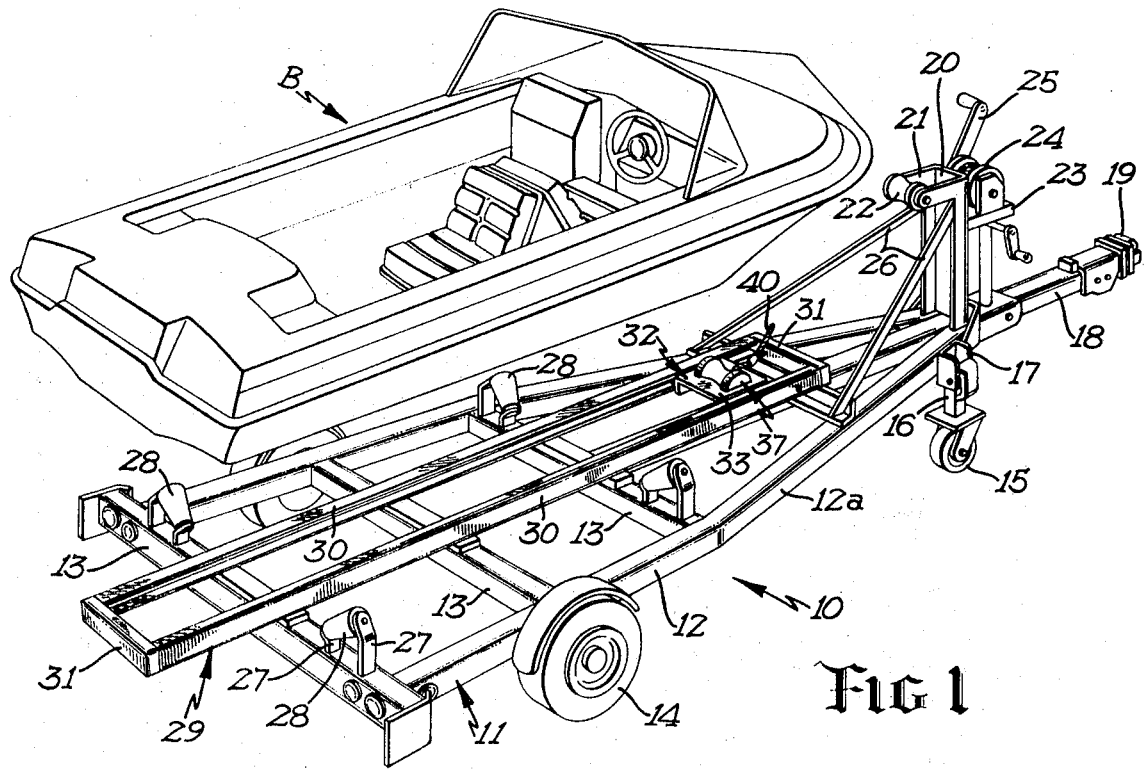
FIG. 1 is a perspective view of the novel boat trailer having the launching and loading device incorporated thereon for use in supporting a typical small craft which is spaced thereabove.
FIG. 2 is a fragmentary top plan view of a portion of the boat trailer and illustrating the launching and loading device.
FIG. 3 is a cross-sectional view taken approximately along line 3—3 of FIG. 2, and looking in the direction of the arrows.

Referring now to the drawings and more specifically to FIG. 1, it will be seen that a conventional boat trailer, designated generally by the reference numeral 10, is there shown. This boat trailer 10 is of the type which is towed by a vehicle such as an automobile and is adapted to support a small craft such as the boat B thereon. This trailer includes an elongate chassis 11 comprised of a pair of longitudinal frame members 12 which are rigidly interconnected by transverse frame members 13. It will be noted that the longitudinal frame members 12 include front portions 12a which converge forwardly toward the front end of the trailer. The trailer is provided with a pair of ground engaging wheels 14 which supports the trailer as it is being towed by a vehicle.

The trailer also includes a front caster wheel 15 having a standard 16 which is mounted on a bracket 17. This front caster wheel is retractable and extensible to permit the trailer to have a three-point support when the front end of the trailer is not supported by a towing vehicle.

In this regard, it will be noted that the chassis 11 is provided with an elongate drawbar 18 which extends between and is rigidly affixed to the front ends of the longitudinal frame members 12. The rear end portion of the drawbar 18 is also rigidly affixed to the forward-most transverse frame member 13. It will also be noted that the drawbar 18 projects forwardly beyond the chassis and has a hitch 19 at the front end thereof which is adapted to be connected in articulated relation to the mating hitch member mounted on the towing vehicle.

A generally channel shaped post 20 is fixedly mounted on the front end portion of the chassis 11 and projects upwardly therefrom. This post 20 has a pair of rearwardly projecting ears 21 thereon which accommodate the axle of a roller 22. It will be noted that the roller 22 is of symmetrical configuration and tapers from opposite ends thereof to a relatively narrow waist as best seen in FIG. 1. This roller provides a revolvable support for the bow of the boat when the boat is in loaded relation on the trailer. A bracket 23 is rigidly mounted on the post 20 and projects forwardly therefrom and accommodates a winch 24. The drum or spool of the winch 24 accommodates a cable and the winch is provided with a conventional crank handle 25 to facilitate turning of the handle. The free end of the cable of the winch 24 will be secured to an eye or other attachment means on the bow end of the boat B to facilitate launching and loading the boat in a well-known manner.

It will also be noted that the chassis is provided with a plurality of pairs of straps 27 which are affixed to the upper surface of certain of the transverse members 13, and each pair of straps accommodates the axle of a tapered roller 28. These tapered rollers are arranged so that their respective axes of rotation extend downwardly and inwardly. It will further be noted that the rollers 28 are arranged in opposed pairs and, in the embodiment shown, two pairs of rollers are provided and engage the hull of the boat to permit the hull of the boat to be rollably moved longitudinally of the chassis.

The trailer 10 is provided with a launching and loading device designated generally by the reference numeral 29. This launching and loading device 29 is comprised of a pair of elongate, similar tracks 30 which are disposed in spaced apart parallel relation, and which are rigidly affixed to the upper surface of the transverse members 13. Referring now to FIG. 3, it will be seen that the tracks 30 are of channel-shaped cross-sectional configuration each including horizontal upper and lower flanges which are rigidly interconnected by a vertical web. It will be noted that the tracks 30 are rigidly interconnected at their respective front and rear ends by cross members 31. The tracks extend from the front end portion of the trailer chassis and project rearwardly substantially beyond the rear end portion thereof. The tracks are centrally located with respect to the trailer and it is pointed out that the width of the entire track structure comprises only a very minor portion of the overall width dimension of the trailer. It will also be noted that the upper flange of the tracks is disposed substantially below the inclined upper bearing surfaces of the inclined stationary rollers 28.

A carriage 32 is rollably supported on the tracks 30 and the carriage is comprised of a substantially flat support plate 33 having opposite longitudinal edges thereof bent at right angles thereto and extending downwardly therefrom. These downturned flanges of the support plate 33 are suitably apertured for accommodating the respective end portions of a pair of axles 35. Opposite ends of each of the axles 35 have rollers 36 secured thereto and these rollers are positioned in the tracks 30. It will therefore be seen that the carriage 33 is shiftable longitudinally of the trailer by its movement along the tracks 30.

The support plate 33 has a bow support member 37 affixed to the upper surface thereof and projecting upwardly therefrom. It will be noted that this bow support member has a substantially flat lower surface but is otherwise tapered from opposite ends thereof uniformly and symmetrically towards the central portion thereof to present a symmetrically concave upper support surface 38. This bow support member extends transversely of the support plate adjacent the transverse center line thereof. The bow support member and carriage are adapted to engage the hull of the boat adjacent the bow thereof to support the same during launching and loading of the boat.

In this regard, when a boat is in loaded condition on the trailer 11, the cable of the winch 24 will be secured to the bow end of the boat and the boat will be pulled forwardly so that the bow end of the boat engages and is supported against the roller 22. The hull of the boat will be supported upon the stationary rollers 28 in a well-known manner. When it is desirable to launch the boat from the loaded condition, the winch cable may be unwound and the bow portion of the hull will be supported upon the carriage 32. This carriage will be at the forward end portion of the track structure and the trailer may be pushed to the edge of the water so that the trailer is in a rearwardly declined position. In this position, the rear end portion of the tracks will extend below the surface of the water, since this rear end portion of the tracks projects rearwardly a substantial distance beyond the rear end of the trailer.

The boat may be moved rearwardly under the control of the winch 25 while supported by the carriage 32 and by the rollers 28. As the boat is moved further rearwardly, the bow portion of the boat will be continuously supported by the carriage as the bow moves rearwardly beyond the forward set of stationary rollers 28. The bow continues to be supported by the carriage in cradled relation upon the support member 38 as the bow moves rearwardly beyond the rear pair of rollers 28 until the boat is completely launched.

In loading the boat, the reverse procedure is followed. The boat will be floating in shallow water and the trailer may be moved rearwardly until the rearwardly projecting portion of the track structure is positioned below the surface of the water and below the bow portion of the hull. The carriage 32 will then be moved rearwardly to its full length of rearward travel. This movement of the carriage may be controlled by a rope or cable 39 which extends through an opening 40 in the support plate 33.

The winch cable will then be attached to the boat and the boat will be pulled forwardly until the bow portion of the hull is supported upon the bow support member 38 of the carriage 32. Thereafter, the boat may be winched forwardly and as it is pulled forwardly, the carriage will also move forwardly supporting the bow end of the boat. As the bow end of the boat passes the rear most pair of rollers 28, the boat will then be supported by this pair of rollers along with the carriage. Thus a three-point rollable support is immediately provided the boat during the initial loading stages. As the boat is pulled forwardly, the carriage continues to support the bow portion of the boat even as the hull of the boat engages the forward-most pair of rollers 28. Finally, the boat will be completely loaded but there will be a minimum of drag due to the support provided by the rollable carriage 32.

The width of the carriage constitutes only a minor portion of the width of the boat so that the boat launching and loading device may be readily mounted on most conventional trailers without requiring extensive structural alteration to the trailer. The boat support member 37 while being quite compact in construction is effective to support the bow of the boat during the launching and loading operation but serves to minimize the drag load during these operations. Thus the entire launching and loading operation is made much easier by the boat launching and loading device. It will be noted that one of the track structures 30 has an opening 41 in the web portion thereof to permit removal of the bolt or nut which secures the associated roller 36 on the carriage. With this arrangement, the carriage may be disassembled and removed from the tracks for maintenance and the like.

From the foregoing description it will be seen that I have provided a conventional trailer with a novel boat launching and loading device which is highly effective in facilitating launching and loading a boat. It will be noted from the preceding description that the track structure for the launching and loading device is of relatively narrow width but projects substantially beyond the rear end portion of the trailer so that the bow portion of the boat is continuously supported during both the terminal part of the launching operation and the initial part of the loading operation.

It will therefore be seen that the novel boat launching and loading device is not only of simple and inexpensive construction, but one which functions in a more efficient manner than any heretofore known comparable device.

What is claimed is:

1. A boat trailer and launching vehicle comprising
   an elongate chassis having a drawbar on the front end thereof and projecting forwardly therefrom, a hitch on the front end of said drawbar, a pair of ground engaging wheels on said chassis, a winch having a cable wound thereon mounted on said chassis adjacent the front end thereof, a plurality of longitudinally spaced apart tapered rollers on said chassis arranged in transverse rows for supporting a boat on the chassis for longitudinal movement relative thereto, each of said rollers extending downwardly and inwardly with respect to said chassis,
   a launcher device including a pair of elongate parallel tracks of channel shaped cross-sectional configuration fixedly mounted on said chassis extending from the front end portion thereof and projecting beyond the rear end portion of the chassis, a pair of cross members each being rigidly interconnected with adjacent ends of said track member, the upper surface of said tracks being disposed below the upper surface of said inclined rollers,
   a carriage mounted on said tracks and including a substantially flat carriage plate, a plurality of rollers revolvably mounted on said plate and engaging the tracks to rollably support the plate for movement along the tracks,
   a bow supporting member secured to the upper surface of said plate and extending transversely thereof, said support member presenting a symmetrically concave upper surface and cooperating with the tapered rollers to provide a three point revolving support for the boat during initial and final locking and loading thereof with respect to the trailer.

2. The trailer as defined in claim 1 wherein said carriage has a width dimension substantially less than the width dimension of a boat to be launched.

3. The trailer as defined in claim 1 wherein said tracks are positioned between said pairs of tapered rollers and are disposed at the lower surface than the upper surface of said tapered rollers.

4. The trailer as defined in claim 1 wherein one of said tracks has an opening therein intermediate the ends thereof to permit the carriage to be readily disassembled for removal of the carriage from the tracks.

5. The trailer as defined in claim 1 wherein said bow supporting member has a substantially flat lower surface and is symmetrically tapered inwardly from opposite ends thereof.

* * * * *